(12) United States Patent
Li et al.

(10) Patent No.: US 11,746,647 B2
(45) Date of Patent: Sep. 5, 2023

(54) FLOW FIELD MEASUREMENT DEVICE AND METHOD FOR SCALE MODEL OF NATURAL GAS HYDRATE RESERVOIR

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yi Wang, Guangzhou (CN); Zhaoyang Chen, Guangzhou (CN); Zhiming Xia, Guangzhou (CN); Gang Li, Guangzhou (CN); Yu Zhang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 492 days.

(21) Appl. No.: 17/059,202

(22) PCT Filed: Sep. 8, 2020

(86) PCT No.: PCT/CN2020/114080
§ 371 (c)(1),
(2) Date: Nov. 25, 2020

(87) PCT Pub. No.: WO2021/159694
PCT Pub. Date: Aug. 19, 2021

(65) Prior Publication Data
US 2022/0228474 A1 Jul. 21, 2022

(30) Foreign Application Priority Data

Aug. 6, 2020 (CN) .................. 202010783619.X

(51) Int. Cl.
G01N 11/02 (2006.01)
E21B 47/06 (2012.01)
G01L 13/06 (2006.01)

(52) U.S. Cl.
CPC .............. *E21B 47/06* (2013.01); *G01L 13/06* (2013.01)

(58) Field of Classification Search
None
See application file for complete search history.

(56) References Cited

U.S. PATENT DOCUMENTS

2015/0205004 A1* 7/2015 Li .................. G01V 99/005 703/10
2016/0251943 A1* 9/2016 Li ...................... B01J 12/02 422/162

(Continued)

FOREIGN PATENT DOCUMENTS

CA 2912301 A1 7/2016
CN 101550816 A 10/2009
(Continued)

*Primary Examiner* — Alexander A Mercado
(74) *Attorney, Agent, or Firm* — Bayramoglu Law Offices LLC

(57) ABSTRACT

A flow field measurement device and a method for a scale model of a natural gas hydrate reservoir are provided. The measurement device includes non-central vertical well pressure sensors, non-central vertical well outlet valves, communicating vessel valves, differential pressure sensors, a communicating vessel, a central vertical well outlet valve, and a central vertical well pressure sensor. By providing differential pressure sensors, between a measuring point of the central vertical well and a measuring point of each of the non-central vertical wells, to measure pressure differences, the flow field measurement device enables a reasonable distribution of a three-dimensional space inside the reactor to analyze gas-liquid flow trends in the reactor with a (Continued)

simulated flow field. Determining whether to turn on the differential pressure sensors according to a predetermination based on a feedback from the pressure sensors, allows flow field measurements in the reactor under both high and low pressure differences.

15 Claims, 3 Drawing Sheets

(56) References Cited

U.S. PATENT DOCUMENTS

| | | | |
|---|---|---|---|
| 2016/0305205 A1* | 10/2016 | Li | G01N 33/241 |
| 2016/0357888 A1* | 12/2016 | Li | E21B 7/00 |
| 2017/0292904 A1* | 10/2017 | Xing | G01N 33/241 |
| 2018/0172574 A1* | 6/2018 | Li | B01J 3/03 |
| 2021/0190666 A1* | 6/2021 | Xie | G01N 15/0806 |
| 2022/0235646 A1* | 7/2022 | Li | E21B 47/002 |
| 2022/0301457 A1* | 9/2022 | Li | G09B 23/40 |

FOREIGN PATENT DOCUMENTS

| | | | |
|---|---|---|---|
| CN | 102162353 A | | 8/2011 |
| CN | 102305052 A | * | 1/2012 |
| CN | 102305052 A | | 1/2012 |
| CN | 103185772 A | | 7/2013 |
| CN | 104234708 A | | 12/2014 |
| CN | 105571647 A | | 5/2016 |
| CN | 111929341 A | | 11/2020 |
| CN | 112031714 A | | 12/2020 |
| CN | 112034135 A | | 12/2020 |

* cited by examiner

US 11,746,647 B2

FLOW FIELD MEASUREMENT DEVICE AND METHOD FOR SCALE MODEL OF NATURAL GAS HYDRATE RESERVOIR

CROSS REFERENCE TO THE RELATED APPLICATIONS

This application is the national stage entry of International Application No. PCT/CN2020/114080, filed on Sep. 8, 2020, which is based upon and claims priority to Chinese Patent Application No. 202010783619.X, filed on Aug. 6, 2020, the entire contents of which are incorporated herein by reference.

TECHNICAL FIELD

The present invention relates to experimental simulation technology, and particularly relates to flow field measurement device and method for scale model of natural gas hydrate reservoir.

BACKGROUND

The field measurements in an experimental system for studying natural gas hydrates generally involve temperature field, pressure field, and flow field. For temperature field, perfect real-time measurement has been realized by arranging a large number of temperature sensors. For pressure field, the real-time measurement of pressure field of an entire reactor could be realized by providing a pressure sensor at the inlet and outlet of the reactor respectively. Meanwhile, it has been difficult to realize the measurement of flow field. For example, patent literature CN102305052A disclosed a device and a method for three-dimensional multi-well exploitation experiment of natural gas hydrate.

Most experimental systems for studying natural gas hydrates are small in scale, and therefore the flow field measurement is meaningless and also difficult to realize. Though the flow filed measurement is useful and necessary for large-scale experimental systems for studying natural gas hydrate, it is still difficult to realize. At present, devices for measuring flow field are mostly designed to allow visual inspection, such as providing optical generators in combination with cameras or disposing visual units such as sight glasses, for observing or filming the change of flow field and thereby realize the measurement of flow field. However, natural gas hydrates are mostly accumulated in porous media, wherein use of sight glasses only enables observation of the porous media, while it is difficult to send a camera deep into a reactor and film in the environment inside the reactor. It is impossible to effectively observe or measure the flow field in the reactor by these means.

SUMMARY

One object of the present invention is to overcome the above deficiency of prior art technology, by providing a device and a method for flow field measurement in a natural gas hydrate experimental system, which realizes a real-time measurement of flow filed in a reactor.

In order to realize the above object, the technical solution of the present invention comprises the following aspects.

A first aspect of the present invention is to provide a flow field measurement device for a natural gas hydrate experimental system, wherein the natural gas hydrate experimental system comprises a reactor; the reactor is divided into a plurality of layers from top to bottom for simulating a hydrate reservoir; a plurality of vertical wells are disposed throughout each layer, including one central vertical well located at center and non-central vertical wells being the remainders; the flow field measurement device comprises non-central vertical well pressure sensors, non-central vertical well outlet valves, communicating vessel valves, differential pressure sensors, a communicating vessel, a central vertical well outlet valve, and a central vertical well pressure sensor; wherein, the non-central vertical well pressure sensors, the non-central vertical well outlet valves, the differential pressure sensors, and the communicating vessel valves are respectively provided in an amount identical to that of the non-central vertical wells; each of the non-central vertical well is provided with a non-central vertical well outlet pipeline, wherein each non-central vertical well outlet pipeline is correspondingly provided with one of the non-central vertical well pressure sensors, one of the non-central vertical well outlet valves, one of the differential pressure sensors, and one of the communicating vessel valves communicatedly in sequence, and all of the communicating vessel valves are connected with the communicating vessel;

the central vertical well is provided with a central vertical well outlet pipeline, wherein the central vertical well outlet pipeline is provided with the central vertical well pressure sensor and the central vertical well outlet valve communicatedly in sequence, and the central vertical well outlet valve is connected with the communicating vessel.

Furthermore, the flow field measurement device for the natural gas hydrate experimental system comprises a display terminal, wherein a data output of each of the non-central vertical well pressure sensors, the central vertical well pressure sensor, and the differential pressure sensors is connected to the display terminal.

Furthermore, the differential pressure sensors and the communicating vessel are disposed outside the reactor.

Furthermore, the differential pressure sensors have a measuring accuracy higher than that of the non-central vertical well pressure sensors, and a measuring range lower than that of the non-central vertical well pressure sensors.

Furthermore, the display terminal is a computer, a tablet computer, or a mobile phone.

Furthermore, the reactor is divided into three layers from top to bottom, and nine vertical wells are evenly disposed throughout each layer.

Furthermore, the communicating vessel is provided with a communicating vessel pressure sensor and a gas injection valve.

A second aspect of the present invention is to provide a flow field measurement method for a natural gas hydrate experimental system, which is conducted using the above-mentioned flow field measurement device, comprising the following steps:

when it is necessary to inspect a flow field in the reactor, recording readings of all the non-central vertical well pressure sensors and the central vertical well pressure sensor to obtain a pressure difference between each vertical well and the central vertical well, and comparing the obtained pressure difference with a measuring range of the differential pressure sensor; if the obtained pressure difference is higher than the measuring range of the differential pressure sensor, then the obtained pressure difference is determined to be a pressure difference between the non-central vertical well corresponding to the differential pressure sensor and the central vertical well; if the obtained pressure difference is not higher than the measuring range of the differential pressure sensor, then opening the non-central vertical well outlet valve and the communicating vessel valve which are connected to the differential pressure sensor, and measuring the pressure difference between the corresponding non-central vertical well and the central vertical well using the differential pressure sensor.

Furthermore, the method comprises the following steps of testing the differential pressure sensors using the gas injection valve:

closing the non-central vertical well outlet valves, such that the differential pressure sensors show a same reading at their ends connected to the non-central vertical well outlet valves;

connecting the gas injection valve of the communicating vessel to a gas cylinder with a given pressure lower than the measuring range of the differential pressure sensors; opening the communicating vessel valves, and opening a valve of the gas cylinder, recording readings of the differential pressure sensors, and determining based on the recorded readings of the differential pressure sensors whether the differential pressure sensors require replacement or repair.

A third aspect of the present invention is to provide another flow field measurement method for a natural gas hydrate experimental system, wherein the natural gas hydrate experimental system comprises a reactor, the reactor is divided into a plurality of layers from top to bottom for simulating a hydrate reservoir, and a plurality of vertical wells are disposed throughout each layer, including one central vertical well located at center and non-central vertical wells being the remainders; the method comprises the following steps:

connecting a measuring point of the central vertical well to a measuring point of each of the non-central vertical wells with a differential pressure sensor respectively, performing pressure measurements in a three-dimensional space inside the reactor, quantifying a flow field inside the reactor according to pressure differences between the points to analyze gas-liquid flow trends in the reactor.

Compared with the prior art, the present invention has the following advantages:

With the flow field measurement device, the flow field inside the reactor is quantified according to the pressure differences between the points, accurately and effectively. Providing differential pressure sensors, between a measuring point of the central vertical well and a measuring point of each of the non-central vertical wells, to measure the pressure differences, enables reasonable distribution of three-dimensional space inside the entire reactor, making it easier to analyze the gas-liquid flow trends in the reactor with the simulated flow field. The step of determining whether to turn on the differential pressure sensors according to a predetermination based on the feedback from the pressure sensors, allows flow field measurements in the reactor under both high and low pressure differences and effective protection of the differential pressure sensors. Meanwhile, since communication of the entire measurement device is realized by the vertical well outlet pipelines, the measurement device can be externally connected to the reactor, in other words, the differential pressure sensors and the communicating vessel can be disposed outside the reactor. Thus, it is not necessary to conduct significant modifications to the entire gas hydrate system, and no damage will be done to the experimental devices; for a natural gas hydrate experimental system without flow field measurement function, it is possible to introduce the present device whenever it is required.

Reference signs: 1—central vertical well outlet pipeline; 2—central vertical well pressure sensor; 3—central vertical well outlet valve; 4—communicating vessel; 5—non-central vertical well outlet pipeline; 6—non-central vertical well pressure sensor; 7—non-central vertical well outlet valve; 8—differential pressure sensor; 9—communicating vessel valve; 10—communicating vessel pressure sensor; 11—gas injection valve; 20—reactor; 200—reactor body; 201—upper cover; 202—lower cover; 203—upper circulation coil; 204—lower circulation coil; 205—temperature control pipe; 206—bolt.

DETAILED DESCRIPTION OF THE EMBODIMENTS

In the description of the present invention, it should be noted that, unless otherwise clearly specified and limited, the terms such as "provide" and "connect" should be understood in a broad sense; for example, a connection can be a fixed connection, a detachable connection, or an integration connection, it can also be a mechanical connection, an electrical connection, or a signal connection, and it can also be a direct connection, an indirect connection through an intermediate medium, or an internal connection between two components. For those of ordinary skill in the art, the specific meaning of the above terms in the present invention should be understood depending on specific circumstances. The technical solution of the present invention will be further described below in combination with the drawings and embodiments.

Figure 1:
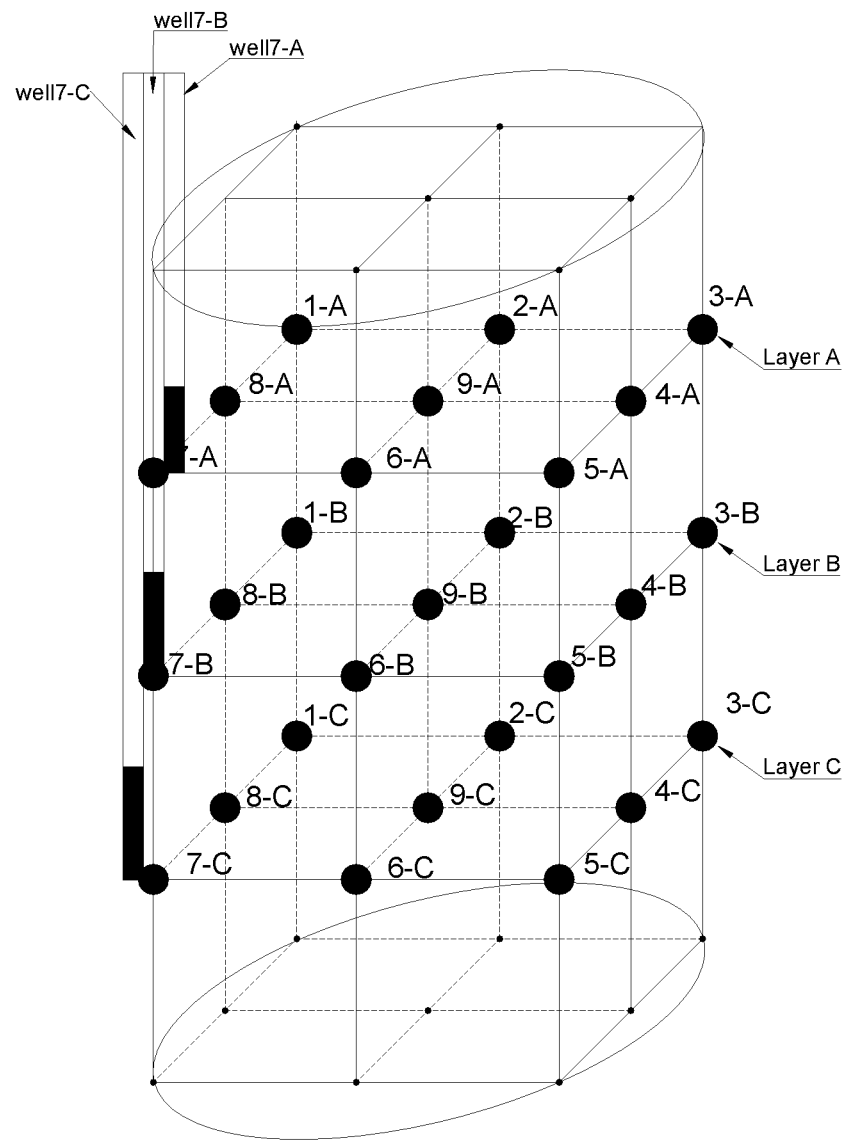
FIG. 1 shows the distribution of wells in the natural gas hydrate experimental system.

Reference is made to FIG. 1 that there are twenty-seven vertical wells disposed inside the reactor of the natural gas hydrate experimental system of the present embodiments, and the natural gas hydrate reservoir is divided into three layers, wherein nine vertical wells are symmetrically distributed throughout each layer. The wells are respectively numbered as 1-A, 2-A, . . . , 9-B, and 9-C, wherein the vertical well 9-B located at center is a central vertical well, while the remaining vertical wells are non-central vertical wells.

Figure 2:
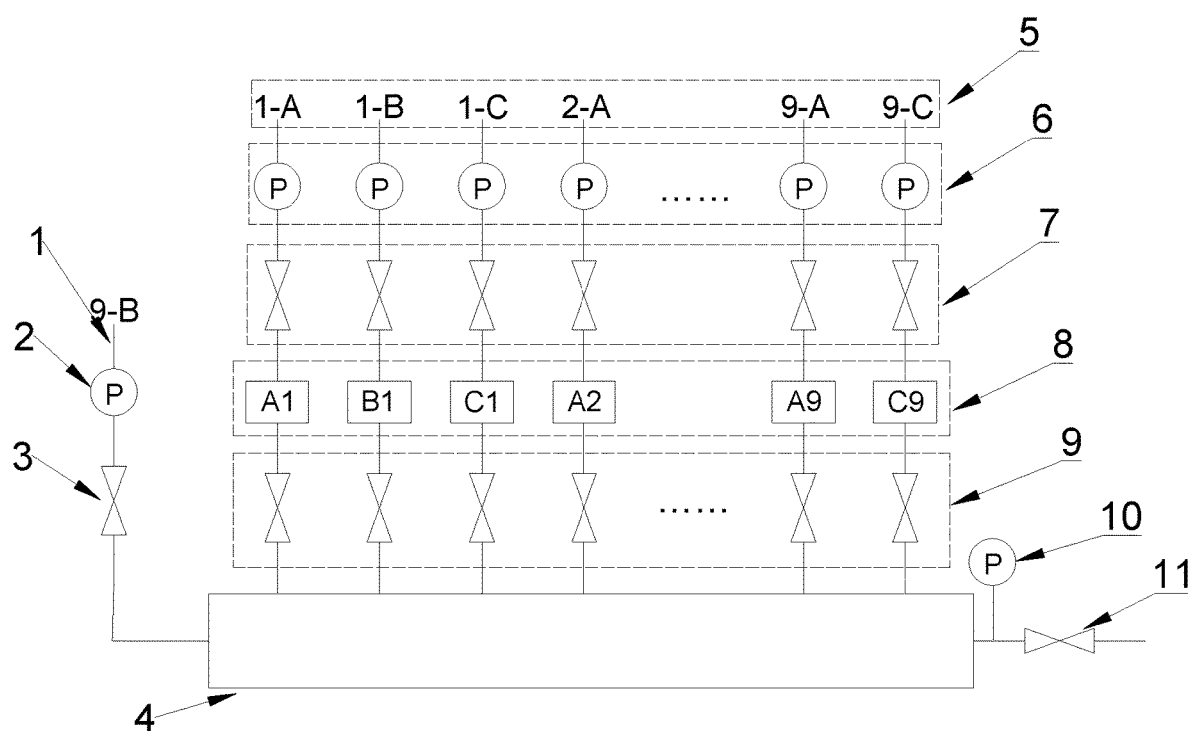
FIG. 2 shows the composition of the flow field measurement device.

As shown in FIG. 2, the flow field measurement device provided in the present embodiment mainly comprises non-central vertical well pressure sensors 6, non-central vertical well outlet valves 7, communicating vessel valves 9, differential pressure sensors 8, a communicating vessel 4, a central vertical well outlet valve 3, and a central vertical well pressure sensor 2.

The non-central vertical well pressure sensors 6, the non-central vertical well outlet valves 7, the differential pressure sensors 8, and the communicating vessel valves 9 are respectively provided in an amount identical to that of the non-central vertical wells. All non-central vertical well outlet pipelines 5, except for the vertical well 9-B, are respectively connected to a non-central vertical well pressure sensor 6, a non-central vertical well outlet valve 7, and one end of a differential pressure sensor 8 in sequence. The other end of the differential pressure sensor 8 is connected to a communicating vessel valve 9. All of the communicating vessel valves 9 are connected with the communicating vessel 4. The other end of the communicating vessel 5 is connected to the central vertical well outlet valve 3, the central vertical well pressure sensor 2, and a central vertical well outlet pipeline 1.

The twenty-six differential pressure sensors are respectively numbered as A1, B1, C1, A2, . . . , A9, and C9, representing the differential pressure sensor connecting the well 1-A and well 9-B, the differential pressure sensor connecting the well 1-B and well 9-B, . . . , the differential pressure sensor connecting the well 9-A and well 9-B, and the differential pressure sensor connecting the well 9-C and well 9-B. Specifically, the differential pressure sensors 8 have a measuring accuracy higher than that of the central vertical well pressure sensor 2 and non-central vertical well pressure sensors 6, and a measuring range lower than that of the central vertical well pressure sensor 2 and non-central vertical well pressure sensors 6. Since the pressure sensors are not applicable for low pressure differences due to their low measuring accuracy while the differential pressure sensors 8 have a higher measuring accuracy, when the pressure difference is relatively low, the pressure sensors may show the same readings while the differential pressure sensors is capable of revealing the pressure difference; when the pressure difference is relatively high and exceed the measuring range of the differential pressure sensors, the differential pressure sensors may be damaged. In summary, the differential pressure sensors have a high accuracy but a low measuring range, while the pressure sensors have a high measuring range but a low accuracy, and thus these two kinds of sensors should be used in combination.

Accordingly, when it is necessary to inspect a flow field in the reactor, the first step is recording readings of the twenty-seven pressure sensors to obtain a pressure difference between each vertical well and the central vertical well, and then comparing the obtained pressure difference with a measuring range of the differential pressure sensor; if the obtained pressure difference is higher than the measuring range of the differential pressure sensor, then the obtained pressure difference is determined to be a pressure difference between the non-central vertical well corresponding to the differential pressure sensor and the central vertical well; if the obtained pressure difference is not higher than the measuring range of the differential pressure sensor, then opening the non-central vertical well outlet valve and the communicating vessel valve which are connected to the differential pressure sensor, and measuring the pressure difference between the corresponding non-central vertical well and the central vertical well using the differential pressure sensor. Driven by the pressure differences, gas and liquid will flow spontaneously from a high pressure zone to a low pressure zone (or tend to flow spontaneously from the high pressure zone to the low pressure zone), in other words, the accurate measurement of flow field in the reactor is realized.

In view of the above, with the flow field measurement device, the flow field inside the reactor is quantified according to the pressure differences between the points, accurately and effectively. Providing differential pressure sensors, between a measuring point of the central vertical well and a measuring point of each of the non-central vertical wells, to measure the pressure differences, enables reasonable distribution of three-dimensional space inside the entire reactor, making it easier to analyze the gas-liquid flow trends in the reactor with the simulated flow field. The step of determining whether to turn on the differential pressure sensors according to a predetermination based on the feedback from the pressure sensors, allows flow field measurements in the reactor under both high and low pressure differences and effective protection of the differential pressure sensors. Meanwhile, since communication of the entire measurement device is realized by the vertical well outlet pipelines, the measurement device can be externally connected to the reactor, in other words, the differential pressure sensors and the communicating vessel can be disposed outside the reactor. Thus, it is not necessary to conduct significant modifications to the entire gas hydrate system, and no damage will be done to the experimental devices; for a natural gas hydrate experimental system without flow field measurement function, it is possible to introduce the present device whenever it is required.

As one preferred embodiment, the flow field measurement device further comprises a display terminal, wherein a data output of each of the non-central vertical well pressure sensors 6, the central vertical well pressure sensor 2, and the differential pressure sensors 8 is connected to the display terminal. With such configuration, the display terminal enables the real-time display of the recorded data, so as to realize the real-time measurements of flow field in the reactor. Specifically, the display terminal is a computer, a tablet computer, or a mobile phone, and in the present embodiment, it is a computer.

As another preferred embodiment, the communicating vessel 4 is further provided with a communicating vessel pressure sensor 11 and a gas injection valve 12. Such configuration allows testing the differential pressure sensors 8 using the gas injection valve 12. The method are as follows: closing the non-central vertical well outlet valves, such that the differential pressure sensors show a same reading at their ends connected to the non-central vertical well outlet valves; connecting the gas injection valve of the communicating vessel to a gas cylinder with a given pressure lower than the measuring range of the differential pressure sensors; opening the communicating vessel valves, and opening a valve of the gas cylinder, and recording readings of the differential pressure sensors. Normally, the readings of the differential pressure sensors should be identical; a differential pressure sensor that shows no reading or a significantly different reading requires replacement or repair.

In view of the above, the flow field measurement device of the present embodiment, compare with the prior art, has the following technical advantages:

(1) The pressure sensors and the differential pressure sensors are connected to the computer, which realizes the real-time measurements of flow field in the reactor.

(2) The flow field inside the reactor is quantified according to the pressure differences between the points in the reactor, accurately and effectively.

(3) Providing differential pressure sensors, between a measuring point of the central vertical well and a measuring point of each of the non-central vertical wells, to measure the pressure differences, enables reasonable distribution of three-dimensional space inside the entire reactor, making it easier to analyze the gas-liquid flow trends in the reactor with the simulated flow field.

(4) The step of determining whether to turn on the differential pressure sensors according to a predetermination based on the feedback from the pressure sensors, allows flow field measurements in the reactor under both high and low pressure differences and effective protection of the differential pressure sensors.

(5) The differential pressure sensors are externally disposed for flow field measurements in the reactor; such design will not affect the natural gas hydrate experiment.

(6) It is not necessary to conduct significant modifications to the entire gas hydrate system, and no damage will be done to the experimental devices; for a natural gas hydrate experimental system without flow field measurement function, it is possible to introduce the present device whenever it is required.

(7) Design of the communicating vessel allows testing the differential pressure sensors regardless of the natural gas hydrate experimental system, and thereby the operation is simple, safe, and reliable.

In addition, since currently existing natural gas hydrate experimental devices are constructed, as compared with actual formation environment, in a scale not enough to present a temperature gradient, most reactors are configured to be disposed in a constant temperature water bath. However, in actual exploitation, natural gas hydrate reservoirs are affected by the temperature of the formation, and there will be certain temperature differences and temperature gradient as the temperature changes with depth. The temperature gradient will have a certain impact on the formation and exploitation of natural gas hydrates, resulting in a higher requirement, for simulating the formation temperature gradient, on large-scale natural gas hydrate devices which operate in a situation closer to the actual exploitation; how to accurately regulate the temperature gradient to realize the in-situ temperature field simulation of NGH reservoir is a technical problem to be solved at present.

Figure 3:
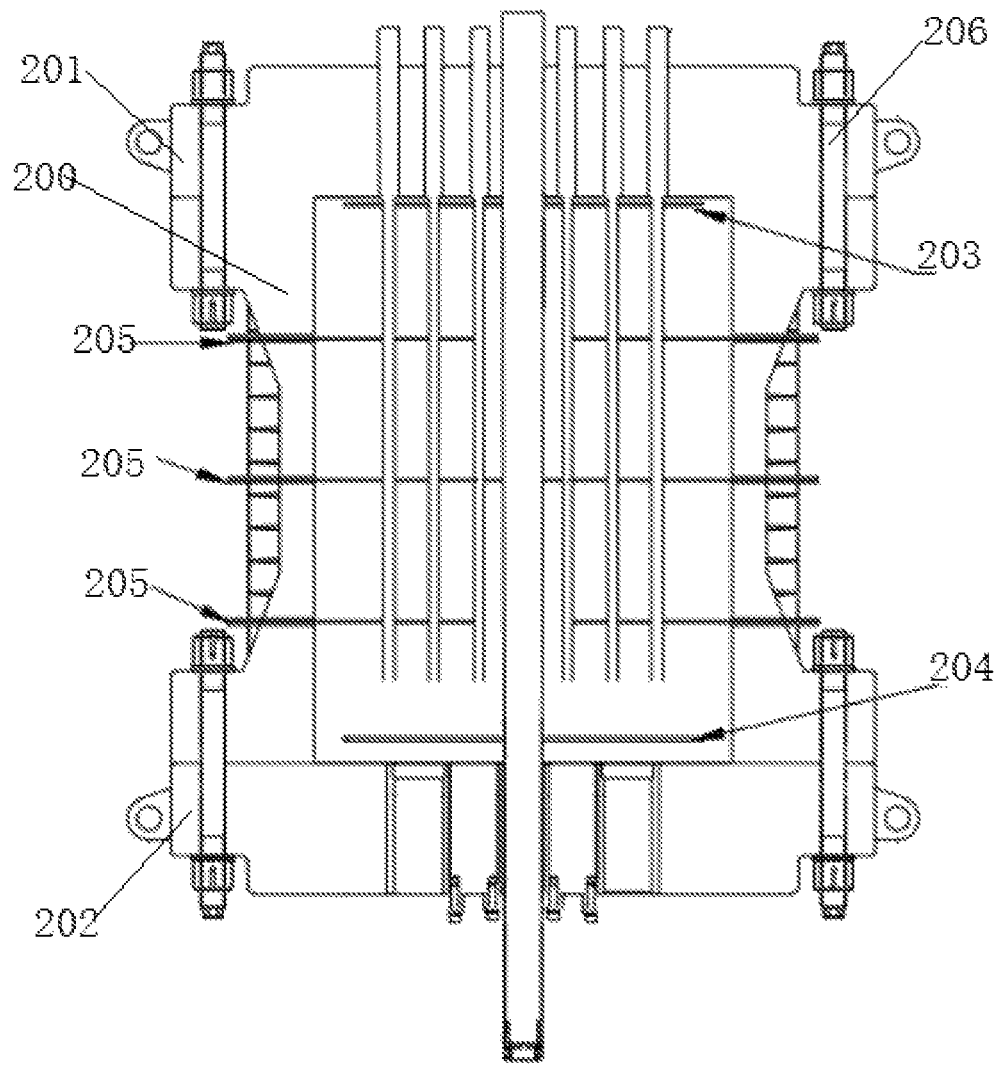
FIG. 3 shows the internal structure of the reactor.

Accordingly, as shown in FIG. 3, the reactor 20 comprises a reactor body 200, an upper cover 201 disposed at an upper surface of the reactor body 200, and a lower cover 202 disposed at a lower surface of the reactor body 200. The connection between the reactor body 200 and the upper and lower covers are realized by means of bolts 206, such that the connection is stable, firm, safe and reliable.

An upper circulation coil 203 and a lower circulation coil 204 are respectively disposed at an upper end and a lower end inside the reactor body 200. The upper circulation coil 203 and the lower circulation coil 204 are respectively provided with an independent heat exchange device (not shown in the drawing) to realize the circulation of the heat transfer medium in the coils. The heat exchange devices are capable of cooling, heating, and maintaining temperature. With the upper circulation coil 203 and the lower circulation coil 204, isothermal planes are formed at the upper end and the lower end inside the reactor body 200. However, with the isothermal planes formed at the upper end and the lower end inside the reactor body only, since heat insulation at the periphery of the reactor is not realized, under the influence of thermal convection, the temperature will be high throughout most of the space from bottom to top, making it impossible to form a balanced temperature gradient, and therefore failing to simulate the temperature gradient throughout the formation. Accordingly, in the present embodiment, N temperature control pipes 205 are spacedly provided inside the reactor body 200 and between the upper circulation coil 203 and the lower circulation coil 204, configured to form a vertical temperature gradient in the reactor body 200, wherein N is a positive integer and determined depending on actual requirement. In the present invention, N is 3, i.e., three temperature control pipes 205 are provided, and each temperature control pipe 205 is also provided with an independent heat exchange device to realize the circulation of the heat transfer medium in the temperature control pipe.

The configuration of providing the upper circulation coil and the lower circulation coil at the upper and lower ends inside the reactor body realizes stable heating. N temperature control pipes are spacedly provided between the upper circulation coil and the lower circulation coil and encircling the reactor body; moreover, each temperature control pipe is also provided with an independent heat exchange device to realize the circulation of the heat transfer medium in the temperature control pipe (i.e., they are also capable of cooling, heating, and maintaining temperature), such that the temperature of each temperature control pipe can be regulated independently, realizing the simulation of formation temperature gradient inside the reactor body.

In addition, since the formation temperature gradually decreases at a certain gradient from bottom to top, in order to realize a more precise simulation of formation temperature gradient, the N temperature control pipes are equally spaced from bottom to top and a constant temperature difference is given between the temperature control pipes; such configuration the arrangement of low temperature zone to high temperature zone at intervals of the same temperature difference and distance from top to bottom. Specifically, the lower circulation coil 204 is set to produce a high temperature T1, while the upper circulation coil 203 is set to produce a low temperature T2; N temperature control pipes 205 are provided, wherein the temperature difference between the temperature control pipes 205 can be expressed as $\Delta T=(T1-T2)/(N+1)$, i.e., the temperature control pipes 205 from top to bottom are respectively set to produce a temperature of $T2+\Delta T$, $T2+2\Delta T$, ..., and $T2+N\Delta T$.

Moreover, in order to maintain the temperature difference $\Delta T$ between the temperature control pipes stable in real time so as to achieve the most realistic simulation of the formation, temperature sensors are provided inside the reactor body 200, configured to monitor the temperatures of the upper circulation coil 203, the lower circulation coil 204 and the N temperature control pipes 205 and transmit the monitored temperature data to a temperature regulator. The temperature regulator regulates in real time the operation of each heat exchange device according to the monitored temperature data, so as to maintain the vertical temperature gradient in the reactor body stable. Specifically in the present embodiment, the temperature difference for the vertical temperature gradient is set to be 5° C., and the temperature control accuracy is ±0.5° C.

The above-mentioned embodiments are only intended to illustrate the technical concept and characteristics of the present invention, enabling those of ordinary skill in the art to understand the content of the present invention and implement them accordingly, but are not intended to limit the scope of the present invention. All equivalent changes or modifications made according to the essence of the present invention should fall within the scope of the present invention.

What is claimed is:

1. A flow field measurement device for a natural gas hydrate system, wherein the natural gas hydrate system comprises a reactor, wherein the reactor is divided into a plurality of layers from top to bottom, a plurality of vertical wells are disposed throughout each layer, the plurality of vertical wells comprise a central vertical well and non-central vertical wells, and the central vertical well is located at a center of the plurality of vertical wells; wherein the flow field measurement device comprises non-central vertical well pressure sensors, non-central vertical well outlet valves, communicating vessel valves, differential pressure sensors, a communicating vessel, a central vertical well outlet valve, and a central vertical well pressure sensor; wherein the non-central vertical well pressure sensors, the non-central vertical well outlet valves, the differential pressure sensors, and the communicating vessel valves are respectively provided in an amount identical to an amount of the non-central vertical wells; each of the non-central vertical wells is provided with a non-central vertical well outlet pipeline, wherein the non-central vertical well outlet pipeline is correspondingly provided with one of the non-central vertical well pressure sensors, one of the non-central vertical well outlet valves, one of the differential pressure sensors, and one of the communicating vessel valves communicatedly in sequence, and all of the communicating vessel valves are connected with the communicating vessel;

the central vertical well is provided with a central vertical well outlet pipeline, wherein the central vertical well outlet pipeline is provided with the central vertical well pressure sensor and the central vertical well outlet valve communicatedly in sequence, and the central vertical well outlet valve is connected with the communicating vessel.

2. The flow field measurement device according to claim 1, wherein the flow field measurement device further comprises a display terminal, wherein a data output of each of the non-central vertical well pressure sensors, the central vertical well pressure sensor, and the differential pressure sensors is connected to the display terminal.

3. The flow field measurement device according to claim 2, wherein the display terminal is a computer, a tablet computer, or a mobile phone.

4. The flow field measurement device according to claim 3, wherein the communicating vessel is provided with a communicating vessel pressure sensor and a gas injection valve.

5. The flow field measurement device according to claim 2, wherein the communicating vessel is provided with a communicating vessel pressure sensor and a gas injection valve.

6. The flow field measurement device according to claim 1, wherein the differential pressure sensors and the communicating vessel are disposed outside the reactor.

7. The flow field measurement device according to claim 6, wherein the communicating vessel is provided with a communicating vessel pressure sensor and a gas injection valve.

8. The flow field measurement device according to claim 1, wherein the differential pressure sensors have a measuring accuracy higher than a measuring accuracy of the central vertical well pressure sensor and a measuring accuracy of the non-central vertical well pressure sensors, and the differential pressure sensors have a measuring range lower than a measuring range of the central vertical well pressure sensor and a measuring range of the non-central vertical well pressure sensors.

9. The flow field measurement device according to claim 8, wherein the communicating vessel is provided with a communicating vessel pressure sensor and a gas injection valve.

10. The flow field measurement device according to claim 1, wherein the reactor is divided into three layers from top to bottom, and nine vertical wells are evenly disposed throughout each layer.

11. The flow field measurement device according to claim 10, wherein the communicating vessel is provided with a communicating vessel pressure sensor and a gas injection valve.

12. The flow field measurement device according to claim 1, wherein the communicating vessel is provided with a communicating vessel pressure sensor and a gas injection valve.

13. A flow field measurement method for a natural gas hydrate system, wherein the flow field measurement method is conducted using the flow field measurement device of claim 12 and comprises the following steps:

recording readings of the non-central vertical well pressure sensors and a reading of the central vertical well pressure sensor to obtain a pressure difference between each vertical well and the central vertical well, and comparing the pressure difference with a measuring range of the differential pressure sensors; if the pressure difference is higher than the measuring range of the differential pressure sensors, then determining the pressure difference to be a pressure difference between the non-central vertical well corresponding to the differential pressure sensor and the central vertical well; if the pressure difference is not higher than the measuring range of the differential pressure sensors, then opening the non-central vertical well outlet valve and the communicating vessel valve connected to the differential pressure sensor, and measuring the pressure difference between the corresponding non-central vertical well and the central vertical well using the differential pressure sensor.

14. The flow field measurement method according to claim 13, wherein the flow field measurement method further comprises the following steps of testing the differential pressure sensors using the gas injection valve:

closing the non-central vertical well outlet valves, such that the differential pressure sensors show a same reading at ends of the differential pressure sensors connected to the non-central vertical well outlet valves; connecting the gas injection valve of the communicating vessel to a gas cylinder with a given pressure lower than the measuring range of the differential pressure sensors; opening the communicating vessel valves, and opening a valve of the gas cylinder, recording readings of the differential pressure sensors, and determining based on the recorded readings of the differential pressure sensors whether the differential pressure sensors require replacement or repair.

15. A flow field measurement method for a natural gas hydrate system, wherein the natural gas hydrate system comprises a reactor, wherein the reactor is divided into a plurality of layers from top to bottom, and a plurality of vertical wells are disposed throughout each layer, the plurality of vertical wells comprise a central vertical well and non-central vertical wells, and the central vertical well is located at a center of the plurality of vertical wells; wherein the flow field measurement method comprises the following steps: connecting a measuring point of the central vertical well to a measuring point of each of the non-central vertical wells with a differential pressure sensor respectively, performing pressure measurements in a three-dimensional space inside the reactor, quantifying a flow field inside the reactor according to pressure differences between the measuring point of the central vertical well and the measuring point of each of the non-central vertical wells to analyze gas-liquid flow in the reactor.

* * * * *